2,940,992

2,2-DIPHENYL-3-THIOLPROPIONIC ACID AND DERIVATIVES THEREOF

Harold E. Zaugg, Lake Forest, and Raymond J. Michaels, Jr., Mundelein, Ill., and Howard J. Glenn, Oak Ridge, Tenn., assignors to Abbott Laboratories, North Chicago, Ill., a corporation of Illinois No Drawing. Filed May 14, 1957, Ser. No. 658,948

8 Claims. (Cl. 260—470)

This invention relates to novel chemical compounds and to a process for preparing same. More particularly, the invention relates to alkyl-oxygen fission derivatives of α-hindered-β-propiolactone such as α,α-diphenyl-β-propiolactone represented by the following formula I 

The compounds to which this invention pertains are bases represented by the following formula

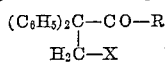

wherein R is selected from the group consisting of hydroxy, amino, ethoxy, and dialkylaminoethoxy; and X is selected from the group consisting of lower alkylthio, phenylthio, isothioureido and thiol; and the non-toxic salts thereof.

The alkyl-oxygen fission products of the above-named propiolactone are represented by the formula II 

wherein X is as described above.

Reacting α,α-diphenyl-β-propiolactone with sulfur compounds provides derivatives whereby X is the sulfur additive. Thus, lower alkyl mercaptals, such as ethyl mercaptan, yield 2,2-diphenyl-3-ethylthiopropionic acid. Aryl mercaptals, such as thiophenol, provide the compound, 2,2-diphenyl-3-phenylthiopropionic acid; thiourea yields 2,2-diphenyl-3-isothioureidopropionic acid. This latter isothioureido derivative of II is easily hydrolysed to form the corresponding thiolpropionic acid.

An aromatic thio acid derivative of II, such as 2,2-diphenyl-3-phenylthiopropionic acid, is converted to a closed ring system of the thiochromanone type, viz., 3,3-diphenyl-thiochromanone when the thio acid is treated with a strong, mineral acid such as sulfuric acid.

The foregoing thio acid derivatives of II are converted to thioamides, such as 2,2-diphenyl-3-ethylthiopropionamide, by treating the corresponding propionic acid derivative with ammonium hydroxide. The thio acid derivatives may also be reacted with lower alkyl alcohols, such as ethanol and di-lower alkyl amino (lower alkyl) alcohols, such as dimethylaminoethanol, to form the respective ester derivatives, ethyl 2,2-diphenyl-3-ethylthiopropionate and β-dimethylaminoethyl 2,2-diphenyl-3-ethylthiopropionate.

The non-toxic salts of the foregoing products can be prepared in the usual way. By the term "salts" is meant the addition salts, such as the hydrochloride and the quaternized ammonium salts, such as the methiodide of the dimethyl aminoethanol ester of thiopropionic acid; the sulfonium salts, such as the methiodide of α,α-diphenyl-3-ethylthiopropionamide, are also intended to be included within the meaning of the term "salts" as used herein.

The compounds of this invention possess analgesic, antispasmodic, anesthetic and hypothermic properties.

The following examples are presented to illustrate in detail the process for preparing the compounds of the invention, but it should be understood that they are not meant to be an exclusive embodiment thereof.

EXAMPLE I

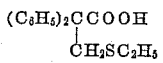

2,2-diphenyl-3-ethylthiopropionic acid

Sodium ethoxide is prepared from 4.6 g. (0.2 mole) of sodium in 40 ml. of dry ethanol. A solution of 12.4 g. (0.2 mole) of ethylmercaptan in 10 ml. of ethanol is then added dropwise with cooling and stirring, followed by a solution of 33.6 g. (0.15 mole) of α,α-diphenyl-β-propiolactone in 100 ml. of ethanol. After standing at room temperature for 48 hours, the mixture is refluxed for 20 hours, cooled and poured into 200 ml. of water. Nonacidic material is eliminated by an ether extraction, and the aqueous layer is acidified with hydrochloric acid. The liberated acid is taken up in ether and dried. Removal of the ether by distillation gives the crude product which, after one recrystallization from dilute ethanol, yields 18.5 g. (43%) of the above named thiopropionic acid derivative, M.P. 146–147° C.

Analysis.—Calcd. for $C_{17}H_{18}O_2S$: C, 71.30; H, 6.33. Found: C, 71.07; H, 6.30.

EXAMPLE II

2,2-diphenyl-3-ethylthiopropionamide

To a solution of 6.3 g. (0.031 mole) of 2,2-diphenyl-3-ethylthiopropionic acid in 40 ml. of dry benzene is added 4.8 g. of thionyl chloride dissolved in 10 ml. of dry benzene. After refluxing for 3 hours, the excess thionyl chloride and benzene are removed under reduced pressure. To the cooled residue of acid chloride is added 30 ml. of concentrated ammonium hydroxide. The oil which results is taken up in ether. Removal of the ether by distillation leaves a solid which, after 2 recrystallizations from 75% ethanol, gives 3.4 g. (54%) of the above named amide product, M.P. 84–85° C.

Analysis.—Calcd. for $C_{17}H_{19}NOS$: C, 71.56; H, 6.71; N, 4.91. Found: C, 71.53; H, 6.46; N, 5.04.

EXAMPLE III

2,2-diphenyl-3-ethylthiopropionamide methiodide

The amide of Example II is reacted with an excess of methyl iodide in refluxing acetone. The resulting sulfonium salt has a M.P. of 158–160° C. (from ethanol).

Analysis.—Calcd. for $C_{18}H_{22}INOS$: C, 50.59; H, 5.19; N, 3.28. Found: C, 51.10; H, 5.22; N, 3.41.

EXAMPLE IV

Ethyl 2,2-diphenyl-3-ethylthiopropionate

The procedure is the same as that outlined in Example II except that ethanol is used in place of ammonium hydroxide. The ester product is obtained in 52% yield.

Analysis.—Calcd. for $C_{19}H_{22}O_2S$: C, 72.59; H, 7.05. Found: C, 72.40; H, 6.92.

EXAMPLE V

Ethyl 2,2-diphenyl-3-ethylthiopropionate methiodide

A methiodide salt of the product from Example IV M.P. 125–126° C., is obtained by the method of Example III.

Analysis.—Calcd. for $C_{20}H_{25}IO_2S$: C, 52.63; H, 5.52; S, 7.02. Found: C, 54.07; H, 5.70; S, 6.68.

EXAMPLE VI

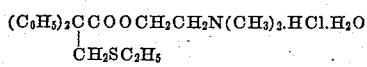

*β-Dimethylaminoethyl 2,2-diphenyl-3-ethylthiopropionate hydrochloride*

The acid chloride of Example II is reacted with excess β-dimethylaminoethanol in benzene to give a 46% yield of the ester hydrochloride product in the form of the monohydrate, M.P. 117–119° C. (from acetone-ether).

*Analysis.*—Calcd. for $C_{21}H_{30}ClNO_3S$: C, 61.22; H, 7.34; N, 3.40. Found: C, 61.39; H, 7.57; N, 3.45.

EXAMPLE VII

The methiodide salt of the product of Example VI is prepared by the method of Example III. The product has a M.P. 151–152° C. (from isopropanol).

*Analysis.*—Calcd. for $C_{22}H_{30}INO_2S$: C, 52.90; H, 6.05; N, 2.81. Found: C, 52.83; H, 6.19; N, 2.95.

EXAMPLE VIII

*2,2-diphenyl-3-phenylthiopropionic acid*

To a solution of 2.20 g. (0.02 mole) of thiophenol in 50 ml. of dry methanol containing sodium methoxide (prepared from 0.46 g. of sodium) is added 4.48 g. (0.02 mole) of α,α-dimethyl-β-propiolactone. After standing at room temperature for several days, the methanol is removed under reduced pressure and the residue is taken up in 75 ml. of water. After extraction with 2 50 ml. portions of ether, the aqueous solution is acidified with concentrated hydrochloric acid. The precipitated oil crystallizes slowly, is removed by filtration and washed with water to give 6.33 g. (94%) of the acid product, M.P. 95–100° C. Two recrystallizations from hexane (Skellysolve B) raises the M.P. to 103–104° C.

*Analysis.*—Calcd. for $C_{21}H_{18}O_2S$: C, 75.42; H, 5.42. Found: C, 75.57; H, 5.54.

EXAMPLE IX

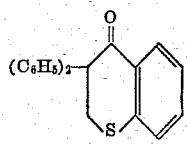

*3,3-diphenylthiochromanone*

To 5 ml. of concentrated sulfuric acid at room temperature is added 0.97 g. of 2,2-diphenyl-3-phenylthiopropionic acid, the product of Example VIII. After constant swirling for 10 minutes, the deep red solution is poured onto ice; the resulting solid is collected at the filter and washed with water. The crude, dry product (0.9 g.) is recrystallized twice by dissolving in acetone and adding hexane (Skellysolve B) to the warm solution. The pure thiochromanone melts at 163–164° C.

*Analysis.*—Calcd. for $C_{21}H_{16}OS$: C, 79.72; H, 5.10. Found: C, 79.94; H, 5.36.

EXAMPLE X

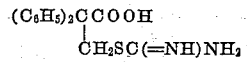

*2,2-diphenyl-3-isothioureido-propanoic acid*

To a boiling solution of 0.40 g. (0.0053 mole) of thiourea in 10 ml. of dry ethanol is added 1.12 g. (0.005 mole) α,α-diphenyl-β-propiolactone. Refluxing for 3 hours rseults in the precipitation of a colorless, crystalline solid which, after refrigeration overnight, is collected at the filter and dried. There is obtained 1.20 g. (80%) of the above named product, M.P. 159.5–162° C.

*Analysis.*—Calcd. for $C_{16}H_{16}N_2O_2S$: C, 63.97; H, 5.37; N, 9.33; S, 10.67. Found: C, 63.96; H, 5.57; N, 8.51; S, 10.37.

EXAMPLE XI

*2,2-diphenyl-3-thiolpropionic acid*

Approximately 13.3 g. of crude product from Example X is warmed with a 10% sodium hydroxide solution until most of it dissolves. After filtering and allowing to stand several hours, the alkaline solution is acidified and the precipitated product (7.3 g., M.P. 180–190° C.) is dried. Two recrystallizations from methanol give colorless prisms of the above named acid, M.P. 200–202.5° C.

*Analysis.*—Calcd. for $C_{15}H_{14}O_2S$: C, 69.74; H, 5.46; S, 12.39. Found: C, 69.91; H, 6.02; S, 12.68.

Others may practice the invention in any of the numerous ways which will be suggested by this disclosure to one skilled in the art. All such practice of the invention is considered to be a part hereof provided it falls within the scope of the appended claims.

We claim:

1. A compound represented by the structure:

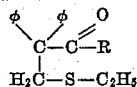

where R is selected from the class consisting of hydroxy, amino and di-lower alkylaminoethoxy.

2. The non-toxic salts of the bases of claim 1.
3. β - Dimethylaminoethyl 2,2 - diphenyl - 3 - ethylthiopropionate.
4. β - Dimethylaminoethyl 2,2 - diphenyl - 3 - ethylthiopropionate hydrochloride.
5. β - Dimethylaminoethyl 2,2 - diphenyl - 3 - ethylthiopropionate methiodide.
6. 2,2-diphenyl-3-ethylthiopropionamide.
7. 2,2-diphenyl-3-ethylthiopropionamide methiodide.
8. 2,2-diphenyl-3-ethylthiopropionic acid.

References Cited in the file of this patent

UNITED STATES PATENTS

| | | |
|---|---|---|
| 2,449,992 | Gresham et al. | Sept. 28, 1948 |
| 2,563,035 | Gresham et al. | Aug. 7, 1951 |
| 2,786,838 | Skinner et al. | Mar. 26, 1957 |

OTHER REFERENCES

Larsen et al.: J. Am. Chem. Soc., 71, 532–3 (1949).
Chem. and Eng. News, Oct. 1, 1956, p. 4780.